(12) United States Patent
Nishikawa

(10) Patent No.: US 7,923,524 B2
(45) Date of Patent: Apr. 12, 2011

(54) SILICONE COPOLYMER HAVING CONDENSED POLYCYCLIC HYDROCARBON GROUP

(75) Inventor: Takeshi Nishikawa, Shiga (JP)

(73) Assignee: Tokyo Ohka Kogyo Co., Ltd., Kawasaki-shi (JP)

( * ) Notice: Subject to any disclaimer, the term of this patent is extended or adjusted under 35 U.S.C. 154(b) by 445 days.

(21) Appl. No.: 11/910,525

(22) PCT Filed: Apr. 3, 2006

(86) PCT No.: PCT/JP2006/307057
§ 371 (c)(1),
(2), (4) Date: Oct. 2, 2007

(87) PCT Pub. No.: WO2006/107029
PCT Pub. Date: Oct. 12, 2006

(65) Prior Publication Data
US 2009/0253886 A1 Oct. 8, 2009

(30) Foreign Application Priority Data

Apr. 4, 2005 (JP) ................................. 2005-107535
Mar. 17, 2006 (JP) ................................. 2006-074767

(51) Int. Cl.
C08G 77/00 (2006.01)
C08G 77/06 (2006.01)
(52) U.S. Cl. ........................... 528/40; 430/272.1; 430/15
(58) Field of Classification Search ......... 28/40; 285/40
See application file for complete search history.

(56) References Cited

U.S. PATENT DOCUMENTS

| 6,420,088 B1 * | 7/2002 | Angelopoulos et al. .... 430/272.1 |
| 2003/0099899 A1 * | 5/2003 | Gronbeck et al. ......... 430/270.1 |
| 2003/0198877 A1 * | 10/2003 | Pfeiffer et al. .................. 430/15 |

FOREIGN PATENT DOCUMENTS

| JP | H08-334900 | 12/1996 |
| JP | 200255452 | 2/2002 |
| JP | 200320335 | 1/2003 |
| JP | 2004-536210 | 12/2004 |
| JP | 2004341479 | 12/2004 |
| JP | 200684799 | 3/2006 |
| KR | 10-2004-0099326 | 11/2004 |
| WO | WO 03011944 | 2/2003 |
| WO | WO 03/089992 | 10/2003 |
| WO | WO 03089992 | 10/2003 |
| WO | WO 2004007192 | 1/2004 |

OTHER PUBLICATIONS

Seyhan Ege (Organic Chemistry, Structure and Reactivity, 1994, Third Edition, p. 544-546).*
Internatioanl Search Report from PCT/JP2006/307057, mailed Jun. 6, 2006.
Charles S. Dulcey et al., "Photochemistry and Patterning of Self-Asembled Monolayer Films Containing Aromatic Hydrocarbon Functional Groups."Langmuir, 1996, vol. 12, pp. 1638-1650.
Office Action issued on May 1, 2008 on the counterpart Korean Application No. 10-2007-7021251.

* cited by examiner

*Primary Examiner* — Ling-Siu Choi
*Assistant Examiner* — Chun-Cheng Wang
(74) *Attorney, Agent, or Firm* — Knobbe, Martens, Olson & Bear, LLP

(57) ABSTRACT

Provided is a novel silicone copolymer which exhibits high absorption even in a far-ultraviolet region of 200 nm or more, and also is soluble in an alkaline reagent since it has a phenolic hydroxyl group. The silicone copolymer comprises a silsesquioxane having a phenol unit and comprises a silsesquioxane having a condensed polycyclic hydrocarbon.

4 Claims, No Drawings

SILICONE COPOLYMER HAVING CONDENSED POLYCYCLIC HYDROCARBON GROUP

RELATED APPLICATIONS

This application is the U.S. National Phase filing under 35 U.S.C. §371 of PCT/JP2006/307057, filed Apr. 3, 2006, which designated the United States and was published in a language other than English, which claims priority under 35 U.S.C. §119(a)-(d) to Japanese Patent Application No. 2005-107535, filed Apr. 4, 2005, and Japanese Patent Application No. 2006-074767, filed Mar. 17, 2006. The content of these applications is incorporated herein by reference in their entireties.

TECHNICAL FIELD

The present invention relates to a novel silicone copolymer that has a condensed polycyclic hydrocarbon group and is useful as an electronic material or a material for fine processing.

BACKGROUND ART

In recent years, as advances have been made to allow the miniaturization of semiconductor elements, further miniaturization for the lithography steps used in their production has been desired. The background of the rapid progress of miniaturization includes an increase in NA of projection lenses, an improvement in the performances of resists, and a shortening of the wavelength.

Under such circumstances, many examples are reported in which polyorganosilsesquioxane having a phenolic hydroxyl group is used for fine processing. Polyorganosilsesquioxane is characterized as being soluble in aqueous alkaline solutions due to the phenolic hydroxyl group included therein (see, Patent Document 1).

Whereas, a trilayer resist process in which an intermediate layer is provided for forming a fine pattern was also proposed. In particular, a ladder silicone copolymer having a phenolic hydroxyl group for use in an antireflection film has also recently been reported. In this report, the antireflection film is formed with an ArF laser particularly used in fine processing (see, Patent Document 2).

However, polysilsesquioxane having a phenolic hydroxyl group cannot form an antireflection film because of its high light transmittivity at a far ultraviolet ray absorption with a wavelength of 248 nm as in the KrF exposure. Therefore, to provide an alkali-soluble siloxane material that has a phenolic hydroxyl group, and exhibits absorption at around the ultraviolet ray with a wavelength of not less than 200 nm has been desired.

Patent Document 1: Japanese Unexamined Patent Application Publication No. Hei 08-334900
Patent Document 2: Japanese Unexamined Patent Application Publication No. 2004-341479

DISCLOSURE OF THE INVENTION

Problems to be Solved by the Invention

The present invention was made in an attempt to provide a silicone copolymer which has a phenolic hydroxyl group and has a condensed polycyclic hydrocarbon group introduced thereto for enhancing absorption at around the ultraviolet ray with a wavelength of not less than 200 nm, and which is soluble in an aqueous alkaline solution.

Means for Solving the Problems

The present inventors extensively investigated silicone copolymers that absorb light even at a wavelength in the far ultraviolet region such as KrF (248 nm), and have a phenolic hydroxyl group. Consequently the inventors found that a silicone copolymer having a specified composition exhibits absorption at the exposure wavelength of a far ultraviolet ray being not less than 200 nm such as KrF (248 nm), and can be a suitable material for use in fine processing due to the presence of a phenolic hydroxyl group. Thus, the present invention was accomplished on the basis of such findings.

Accordingly, the present invention provides a silicone copolymer that includes silsesquioxane having a phenol unit, and silsesquioxane having a condensed polycyclic hydrocarbon group.

Effects of the Invention

According to the present invention, a silicone copolymer is provided that exhibits high absorption even in a far ultraviolet ray region with a wavelength of not less than 200 nm, due to an included condensed polycyclic hydrocarbon group, and that is alkali-soluble due to the presence of a phenolic hydroxyl group.

The silicone copolymer according to the present invention can be used in fine processing processes because it absorbs light in a far ultraviolet ray region with a wavelength of not less than 200 nm such as e.g., an exposure wavelength of 248 nm, thereby performing a role as an antireflection film. In addition, since a variety of substituents can be introduced by way of the phenolic hydroxyl group as a reaction point, it can be also utilized in coating compositions, adhesives and the like.

PREFERRED MODE FOR CARRYING OUT THE INVENTION

An aspect of the present invention is a silicone copolymer including silsesquioxane having a phenol unit, and silsesquioxane having a condensed polycyclic hydrocarbon group.

The silicone copolymer of the present invention preferably includes silsesquioxane having a phenol unit, and silsesquioxane having a condensed polycyclic hydrocarbon group. More specifically, the silicone copolymer of the present invention is a silicone copolymer having a backbone including a silsesquioxane unit having a phenol unit represented by the following general formula:

$$\begin{array}{c} \text{OH} \\ | \\ \text{C}_6\text{H}_4 \\ | \\ (\text{CH}_2)_n \\ | \\ -[\text{SiO}_{3/2}]- \end{array}$$

wherein, n represents an integer of 0 to 10,
and a silsesquioxane unit represented by the following general formula:

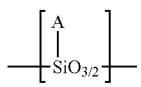

wherein, A represents a condensed polycyclic hydrocarbon group, and more preferably, the silicone copolymer has a repeating unit represented by the following general formula:

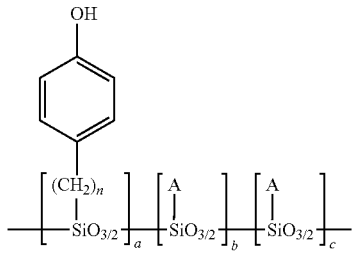

wherein, n represents an integer of 0 to 10; A represents a condensed polycyclic hydrocarbon group; and R represents an organic group; a, b and c represent the value of % by mole; a and b account for 1 to 99% by mole, respectively; c may account for 0% by mole; and the equation a+b+c=100 is satisfied.

The weight average molecular weight (polystyrene equivalent) of the silicone copolymer of the present invention falls preferably within the range of 500 to 100000, and most preferably within the range of 1000 to 10000. The degree of dispersion falls preferably within the range of 1.0 to 10.0, and most preferably within the range of 1.2 to 5.0. Moreover, in the silicone copolymer of the present invention, preferably, as represented by the following general formula:

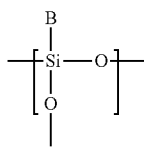

wherein B represents a general organic group,
each silicon atom is bound to three oxygen atoms, while each oxygen atom is bound to two silicon atoms.

The silicone copolymer of the present invention can be also represented by the following general formula:

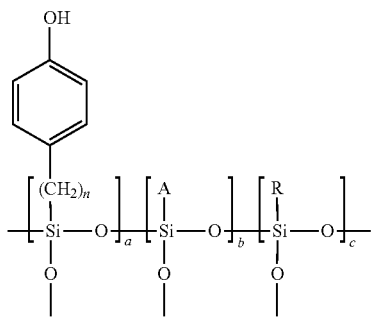

wherein, n represents an integer of 0 to 10; A represents a condensed polycyclic hydrocarbon group; and R represents an organic group; a, b and c represent the value of % by mole; a and b account for 1 to 99% by mole, respectively; c may account for 0% by mole; and the equation a+b+c=100 is satisfied.

Alternatively, the silicone copolymer of the present invention may be a ladder silicone copolymer represented by the following general formula:

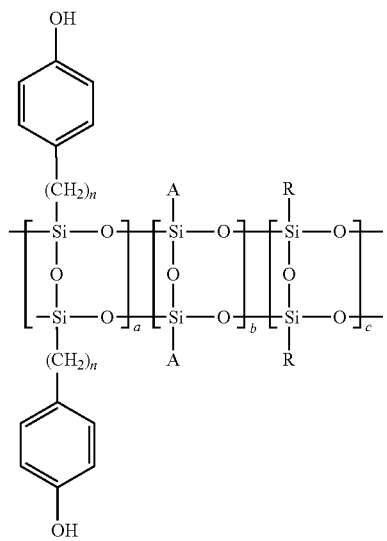

wherein, n represents an integer of 0 to 10; A represents a condensed polycyclic hydrocarbon group; and R represents an organic group; a, b and c represent the value of % by mole; a and b account for 1 to 99% by mole, respectively; c may account for 0% by mole; and the equation a+b+c=100 is satisfied.

In the following general formula:

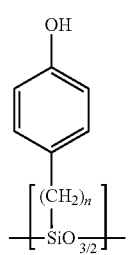

n represents an integer of 0 to 10; however, in light of availability of the source, n is preferably 0 to 5, and also taking into account ease in synthesis, n is more preferably 0 to 3.

In the repeating unit represented by the following general formula:

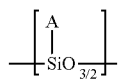

the condensed polycyclic hydrocarbon group represented by A is a hydrocarbon group in which at least two benzene rings are condensed, and preferable examples include naphthalene, anthracene, phenanthrene, pentacene, hexacene, triphenylene, pyrene, picene and the like. Additionally, pentalene, indene, azulene, heptalene, biphenylene, acenaphthylene and the like having a backbone other than benzene ring are also included in preferable examples of the condensed polycyclic hydrocarbon group. Since the polysilsesquioxane is rendered alkali-soluble by taking advantage of the characteristics of the phenolic hydroxyl groups sterically smaller condensed polycyclic hydrocarbon groups are more preferred than sterically bulky groups. Therefore, examples that are more preferable include condensed polycyclic hydrocarbon groups having three or less benzene ring units such as pentalene, indene, azulene, heptalene, biphenylene, naphthalene, anthracene, phenanthrene and the like.

In the repeating unit represented by the following general formula:

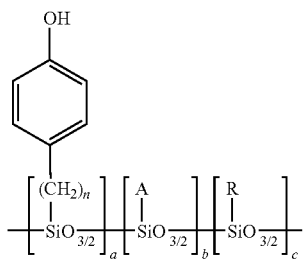

the organic group represented by R is not particularly limited but preferably a straight, branched, or cyclic monovalent hydrocarbon group having 1 to 20 carbon atoms, and may be a crosslinked hydrocarbon group. Preferable examples include straight saturated hydrocarbon groups having 1 to 20 carbon atoms, such as, for example, a methyl group, an ethyl group, a n-propyl group, a n-butyl group, a n-pentyl group, a n-hexyl group, and the like. Examples of the branched hydrocarbon group include an isopropyl group, an isobutyl group, and the like. Examples of the cyclic hydrocarbon group include a cyclopentyl group, a cyclohexyl group, a cycloheptyl group, and the like. Additionally, examples of the crosslinked cyclic hydrocarbon group include the hydrocarbon groups represented by the following formula:

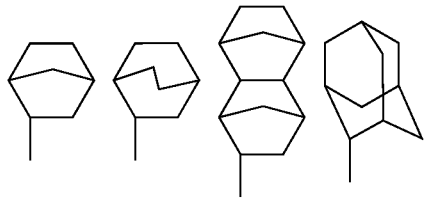

and the like.

The silicone copolymer of the present invention can be produced by hydrolyzing and polymerizing a silicon monomer protected at the phenolic site and a silicon monomer having a condensed polycyclic hydrocarbon group to produce a siloxane polymer protected at the phenolic site, and finally deprotecting the protected part of the phenolic site.

The silicone copolymer of the present invention can be produced preferably by a synthesis method shown below:

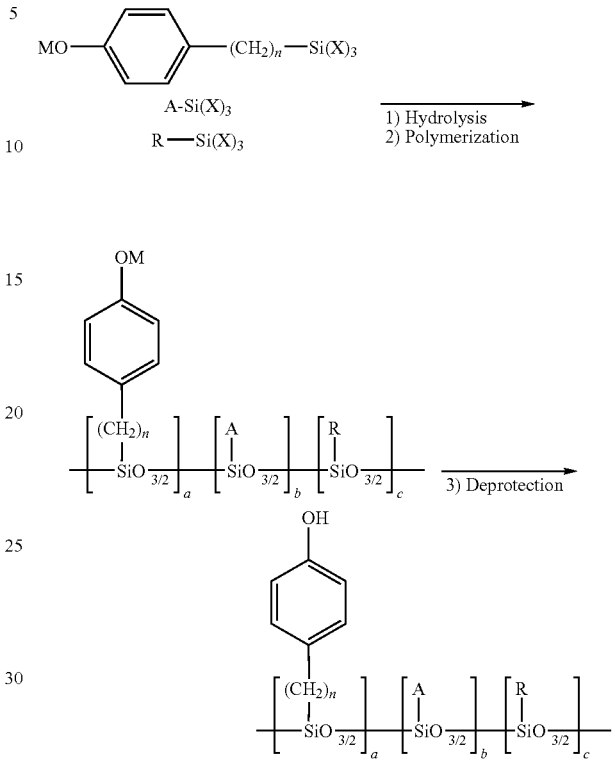

wherein, n represents an integer of 0 to 10; A represents a condensed polycyclic hydrocarbon group; and R represents an organic group; a, b and c represent the value of % by mole; a and b account for 1 to 99% by mole, respectively; c may account for 0% by mole; and the equation a+b+c=100 is satisfied; M represents a hydrocarbon group having 1 to 5 carbon atoms, which may have a carbonyl group; and X represents a hydrolyzable group.

Accordingly, a trialkoxysilane monomer or a trichlorosilane monomer having a protected phenolic hydroxyl group represented by the following formula:

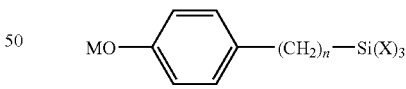

a trialkoxysilane monomer or a trichlorosilane monomer represented by the following formula:

wherein A represents a condensed polycyclic hydrocarbon group, and a trialkoxysilane monomer or a trichlorosilane monomer represented by the following formula:

wherein R represents an organic group, are hydrolyzed and polymerized to yield a polymer, whereby a silicone copolymer represented by the following formula:

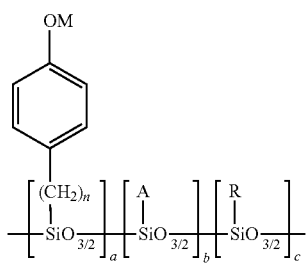

wherein, n represents an integer of 0 to 10; A represents a condensed polycyclic hydrocarbon group; and R represents an organic group; a, b and c represent the value of % by mole; a and b account for 1 to 99% by mole, respectively; c may account for 0% by mole; and the equation a+b+c=100 is satisfied; and M represents a hydrocarbon group having 1 to 5 carbon atoms, can be synthesized.

Herein, M represents a protecting group which protects the phenolic hydroxyl group. Preferable examples of the protecting group include hydrocarbon groups having 1 to 5 carbon atoms, i.e., a methyl group, an ethyl group, a n-propyl group, a n-butyl group, an iso-propyl group, a tert-butyl group, a n-pentyl group and the like, which may have a carbonyl group such as an acetyl group, an ethylcarbonyl group, a n-propylcarbonyl group or the like. Moreover, in light of raw material availability, a methyl group, an ethyl group, and a tert-butyl group are particularly preferred. Whereas, an acetyl group is particularly preferred as the carbonyl group which may be included, also in light of raw material availability.

Furthermore, X represents a hydrolyzable group, a halogen atom, or a straight or branched alkoxy group having 1 to 5 carbon atoms.

In an exemplary hydrolysis, when the silane monomers being used are both a trichlorosilane monomer, hydrolysis can be readily carried out under an approximately neutral condition such as in an aqueous sodium bicarbonate solution. Additionally, when a trialkoxysilane monomer is used, a three dimensional polymer is likely to be formed under a strongly basic condition. Therefore, it is preferable to carry out the reaction under an acidic condition such as in an aqueous hydrochloric acid or phosphoric acid solution, or under a weakly basic condition in which an amine is used.

Next, by heating the oil layer collected following hydrolysis to 200° C., the following compound can be obtained in which the phenolic hydroxyl group is protected by the protecting group M:

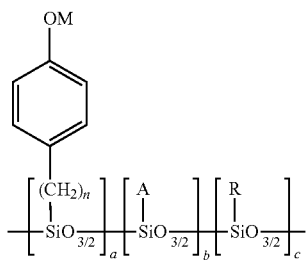

wherein, n represents an integer of 0 to 10; A represents a condensed polycyclic hydrocarbon group; and R represents an organic group; a, b and c represent the value of % by mole; a and b account for 1 to 99% by mole, respectively; c may account for 0% by mole; and the equation a+b+c=100 is satisfied; and M represents a hydrocarbon group having 1 to 5 carbon atoms.

The silicone copolymer has a weight average molecular weight (polystyrene equivalent) preferably falling within the range of 1000 to 100000, and more preferably falling within the range of 2000 to 30000. The degree of dispersion falls preferably within the range of 1.0 to 10.0, and most preferably within the range of 1.5 to 5.0.

Next, the site at which the phenolic hydroxyl group of the silicone copolymer is protected by the protecting group M is deprotected thereby capable of obtaining a silicone copolymer of the following intended compound having a hydroxyl group

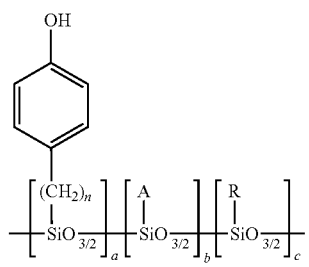

wherein, n represents an integer of 0 to 10; A represents a condensed polycyclic hydrocarbon group; and R represents an organic group; a, b and c represent the value of % by mole; a and b account for 1 to 99% by mole, respectively; c may account for 0% by mole; and the equation a+b+c=100 is satisfied. As an exemplary condition of the deprotection, acidic conditions are preferred, and the deprotection can be readily effected using a deprotecting reagent such as trimethylsilyl iodide. Subsequently, the silicone copolymer can be obtained by conducting hydrolysis with water. In place of the trimethylsilyl iodide, trimethylsilyl chloride and sodium iodide may be used. Alkali conditions should be avoided because the Si—O bond can be cleaved. The solvent used in this deprotecting reaction may be acetonitrile, chloroform or the like, which may be selected depending on the solubility of the silicone copolymer protected at the phenolic site.

By thus performing deprotection, synthesis of the silicone copolymer having a hydroxyl group is enabled. This silicone copolymer exhibits absorption of light at the exposure wavelength of a far ultraviolet ray being not less than 200 nm. A silicon copolymer having a transmittance at a wavelength of 248 nm of 80% or less is preferred. Moreover, for use in applications of antireflection films, a silicon copolymer having a transmittance at a wavelength of 248 nm of 50% or less is more preferred, and a transmittance of 20% or less is still further preferred.

According to the present invention, a silicone copolymer is provided which exhibits high absorption even in the ultraviolet ray region with a wavelength of not less than 200 nm due to the included condensed polycyclic hydrocarbon group, and which is alkali-soluble due to having a phenolic hydroxyl group.

The silicone copolymer of the present invention can be used in fine processing processes because it has the condensed polycyclic hydrocarbon group to absorb light even in an ultraviolet ray region with a wavelength of not less than 200 nm, thereby playing a role as an antireflection film. In addition, since a variety of substituents can be introduced by way of the phenolic hydroxyl group as a reaction point, it can be also utilized in coating compositions, adhesives and the like, but applications are not limited thereto.

EXAMPLES

Hereinafter, the present invention will be explained in detail by way of Examples, however the present invention is not limited thereto.

For the measurements, the following apparatus were used, and the materials were purchased from well-known reagent manufacturers.

Apparatus for Measurements

NMR measurement: 400 MHz NMR spectrometer, manufactured by JEOL Ltd.,

IR measurement: IR Prestige-21, manufactured by Shimadzu Corporation

GPC measurement: HLC-8220, manufactured by Tosoh Corporation

UV measurement: UV-2400PC, manufactured by Shimadzu Corporation ($2\times10^{-4}$ mol/l of ethanol solution in was prepared, which was placed in a prism quartz cell having a light pass of 10 mm, and measured using a 50 W halogen lamp at 25° C.)

Example 1

Synthesis of p-hydroxybenzylsilsesquioxane.9-phenanthrenylsilsesquioxane copolymer (n=7, a=70% by mole, b=30% by mole, c=0% by mole, A=9-phenanthrenyl)

A 500-mL four-necked flask equipped with a stirrer, a reflux condenser, a dropping funnel and a thermometer, was charged with 117 g of water, and thereto a solution of 45.2 g of p-methoxybenzyltrichlorosilane (0.187 mol) and 23.9 g of 9-phenanthrenyltrimethoxysilane (0.080 mol) in 117 g of toluene was added dropwise at a reaction temperature of 10 to 20° C. After completing the dropwise addition, the reaction was allowed stand at the same temperature for 2 hrs and thereafter the reaction mixture was separated to collect the oil layer. The oil layer was then washed with a 5% aqueous sodium bicarbonate solution, and the toluene oil layer was collected.

Next, the toluene solution was transferred to a 1-L four-necked flask equipped with a stirrer, a distillation column, a condenser, and a thermometer. The flask was placed into an oil bath, and gradually heated to remove toluene by evaporation. After removing toluene, the temperature was further elevated, followed by reacting at 200° C. for 2 hrs. Accordingly, 46.5 g of p-methoxybenzylsilsesquioxane.9-phenanthrenylsilsesquioxane copolymer was synthesized having a weight average molecular weight (Mw: polystyrene equivalent) of 3000, and a degree of dispersion (Mw/Mn: polystyrene equivalent) of 1.4 as determined by GPC analysis.

The structure was verified by NMR.
$^1$H-NMR (CDCl$_3$): δ (ppm)=0.82-2.40 (bs, —CH$_2$—), 3.30-3.70 (bs, —OCH$_3$), 6.10-7.70 (m, benzene ring)
IR (KBr): ν (cm$^{-1}$)=1018-1196 (Si—O)

Next, a 500-mL four-necked flask equipped with a stirrer, a reflux condenser, a dropping funnel and a thermometer, was charged with 215 g of acetonitrile, and thereto 40.2 g of the p-methoxybenzylsilsesquioxane.9-phenanthrenylsilsesquioxane copolymer, 66.8 g of sodium iodide (0.445 mol) and 48.4 g of trimethyl chlorosilane (0.445 mol) were sequentially added, followed by refluxing at 65 to 70° C. for 24 hrs. Following refluxing, 71.7 g of water was added dropwise, and the mixture was further refluxed at 65 to 70° C. for 6 hrs. Thereafter, the mixture was cooled, and free iodine was reduced with an aqueous sodium bisulfite solution, followed by washing twice with a 15% saline solution. Thus, the oil layer was collected. Subsequently, the oil layer was poured into water, and the crystalline solid was collected, which was then dried. Accordingly, 43.2 g of the p-hydroxybenzylsilsesquioxane.1-naphthylsilsesquioxane copolymer was synthesized having a weight average molecular weight (Mw: polystyrene equivalent) of 2500, and a degree of dispersion (Mw/Mn: polystyrene equivalent) of 1.3 as determined by GPC analysis.

The structure was verified by NMR and IR analyses.
$^1$H-NMR (CDCl$_3$): δ (ppm)=0.82-2.40 (bs, —CH$_2$—), 6.10-7.70 (m, benzene ring), 8.80-9.10 (bs, —OH)
IR (KBr): ν (cm$^{-1}$)=3340 (—OH), 993-1251 (Si—O)

Example 2

Synthesis of p-hydroxybenzylsilsesquioxane.1-naphthylsilsesquioxane copolymer (n=1, a=70% by mole, b=30% by mole, c=0% by mole, A=naphthyl)

A p-hydroxybenzylsilsesquioxane.1-naphthylsilsesquioxane copolymer having a weight average molecular weight (Mw: polystyrene equivalent) of 2500, and a degree of dispersion (Mw/Mn: polystyrene equivalent) of 1.3 as determined by GPC analysis was synthesized under the same conditions as Example 1 except that 20.9 g of 1-naphthyltrimethoxysilane was used in place of 9-phenanthrenyltrimethoxysilane.

The structure was verified by NMR and IR analyses.
$^1$H-NMR (CDCl$_3$): δ (ppm)=0.85-2.40 (bs, —CH$_2$—), 6.20-8.20 (m, benzene ring), 8.80-9.10 (bs, —OH)
IR (KBr): ν (cm$^{-1}$)=3335 (—OH), 993-1251 (Si—O)

Example 3

Synthesis of p-hydroxybenzylsilsesquioxane.1-anthracenylsilsesquioxane copolymer (n=1, a=70% by mole, b=30% by mole, c=0% by mole, A=anthracenyl)

A p-hydroxybenzylsilsesquioxane.1-anthracenylsilsesquioxane copolymer having a weight average molecular weight (Mw: polystyrene equivalent) of 2300, and a degree of dispersion (Mw/Mn: polystyrene equivalent) of 1.4 as determined by GPC analysis was synthesized under the same condition as Example 1 except that 20.9 g of 1-anthracenyltrimethoxysilane was used in place of 9-phenanthrenyltrimethoxysilane.

The structure was verified by NMR and IR analyses.
$^1$H-NMR (CDCl$_3$): δ (ppm)=0.85-2.40 (bs, —CH$_2$—), 6.20-8.20 (m, benzene ring), 8.65-9.25 (bs, —OH)
IR (KBr): ν (cm$^{-1}$)=3338 (—OH), 995-1250 (Si—O)

Example 4

Synthesis of p-hydroxyphenethylsilsesquioxane.9-phenanthrenylsilsesquioxane copolymer (n=1, a=70% by mole, b=30% by mole, c=0% by mole, A=naphthyl)

A p-hydroxybenzylsilsesquioxane.1-naphthylsilsesquioxane copolymer having a weight average molecular weight (Mw: polystyrene equivalent) of 2000, and a degree of dispersion (Mw/Mn: polystyrene equivalent) of 1.2 as determined by GPC analysis was synthesized under the same condition as Example 1 except that 22.8 g of p-acetoxyphenethyltrichlorosilane was used in place of p-methoxybenzyltrichlorosilane.

The structure was verified by NMR and IR analyses.

$^1$H-NMR (CDCl$_3$): δ (ppm)=0.82-2.45 (bs, —CH$_2$—), 6.20-8.20 (m, benzene ring), 8.80-9.10 (bs, —OH)

IR (KBr): ν (cm$^{-1}$)=3335 (—OH), 990-1250 (Si—O)

Reference Example 1

Synthesis of p-hydroxybenzylsilsesquioxane polymer (n=1, a=100% by mole, b=0% by mole, c=0% by mole)

A p-hydroxybenzylsilsesquioxane polymer having a weight average molecular weight (Mw: polystyrene equivalent) of 4500, and a degree of dispersion (Mw/Mn: polystyrene equivalent) of 1.5 as determined by GPC analysis was synthesized under the same condition as Example 1 except that 1-naphthyltrichlorosilane was not used.

The structure was verified by NMR and IR analyses.

$^1$H-NMR (CDCl$_3$): δ (ppm)=0.82-2.40 (bs, —CH$_2$—), 6.10-7.70 (m, benzene ring), 8.80-9.10 (bs, —OH)

IR (KBr): ν (cm$^{-1}$)=3340 (—OH), 993-1251 (Si—O)

Reference Example 2

Synthesis of p-hydroxybenzylsilsesquioxane·phenylsilsesquioxane copolymer (n=1, a=70% by mole, b=30% by mole, c=0% by mole, A=phenyl)

A p-hydroxybenzylsilsesquioxane·phenylsilsesquioxane copolymer having a weight average molecular weight (Mw: polystyrene equivalent) of 8000, and a degree of dispersion (Mw/Mn: polystyrene equivalent) of 1.8 as determined by GPC analysis was synthesized under the same condition as Example 1 except that 16.9 g of phenyltrichlorosilane was used in place of 1-naphthyltrichlorosilane.

The structure was verified by NMR and IR analyses.

$^1$H-NMR (CDCl$_3$): δ (ppm)=0.82-2.40 (bs, —CH$_2$—), 6.10-7.70 (m, benzene ring), 8.80-9.10 (bs, —OH)

IR (KBr): ν (cm$^{-1}$)=3340 (—OH), 993-1251 (Si—O)

Results of measurement of UV (transmittance) of each of the synthesized silicone copolymer dissolved in ethanol are shown in the following Table. A wavelength of 248 nm is typical for a far ultraviolet ray.

TABLE 1

| | Compound | Composition ratio (a:b:c) | Transmittance (%) at 365 nm | Transmittance (%) at 248 nm |
|---|---|---|---|---|
| Example 1 | p-hydroxybenzylsilsesquioxane·9-phenanthrenylsilsesquioxane copolymer | 70:30:0 | 92.3 | 0.4 |
| Example 2 | p-hydroxybenzylsilsesquioxane·1-naphthylsilsesquioxane copolymer | 70:30:0 | 95.0 | 15.0 |
| Example 3 | p-hydroxybenzylsilsesquioxane·1-anthracenylsilsesquioxane copolymer | 70:30:0 | 92.0 | 0.5 |
| Example 4 | p-hydroxyphenethylsilsesquioxane·9-phenanthrenylsilsesquioxane copolymer | 70:30:0 | 92.5 | 0.8 |
| Reference Example 1 | p-hydroxybenzylsilsesquioxane polymer | 100:0:0 | 99.9 | 92.0 |
| Reference Example 2 | p-hydroxybenzylsilsesquioxane·phenylsilsesquioxane copolymer | 70:30:0 | 99.5 | 92.3 |

(Measured at 2×10$^{-4}$ mol/l of ethanol solution (25° C.))

Accordingly, silicone copolymers having a low degree of transmittance even at a wavelength of 248 nm were obtained by introducing the condensed polycyclic hydrocarbon group.

The invention claimed is:

1. A silicone copolymer comprising:
   silsesquioxane having a phenol unit represented by general formula (I) below; and
   a silsesquioxane unit represented by general formula (II) below:

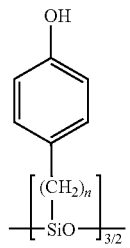

wherein n represents an integer of 0 to 10,

(II)

wherein A represents a naphthyl group or a phenanthrenyl group.

2. A silicone copolymer according to claim 1 having a repeating unit represented by the following general formula:

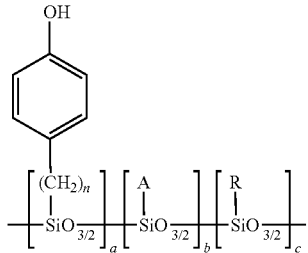

wherein n represents an integer of 0 to 10; A represents a naphthyl group or a phenanthrenyl group; and R represents an organic group; a, b and c represent the value of % by mole; a and b account for 1 to 99% by mole, respectively; c may account for 0% by mole; and a+b+c=100.

3. A silicone copolymer according to claim 1 or 2 having a repeating unit represented by the following general formula:

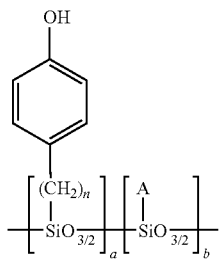

wherein n represents an integer of 0 to 10; A represents a naphthyl group or a phenanthrenyl group; a and b represent the value of % by mole; a and b account for 1 to 99% by mole, respectively; and a+b=100.

4. A method for producing the silicone copolymer according to any one of claim 1, 2 or 3 comprising deprotecting the silicone copolymer having a repeating unit represented by the following general formula:

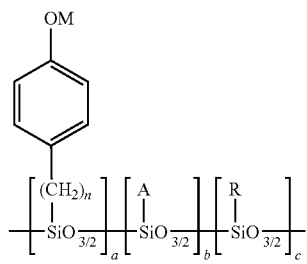

wherein, n represents an integer of 0 to 10; A represents a naphthyl group or a phenanthrenyl group; and R represents an organic group; a, b and c represent the value of % by mole; a and b account for 1 to 99% by mole, respectively; c may account for 0% by mole; and a+b+c=100; and M represents a hydrocarbon group having 1 to 5 carbon atoms, which may have a carbonyl group.

* * * * *